United States Patent [19]

Avitan

[11] Patent Number: 5,487,437
[45] Date of Patent: Jan. 30, 1996

[54] COUPLED DIFFERENTIAL TURNING CONTROL SYSTEM FOR ELECTRIC VEHICLE TRACTION MOTORS

[76] Inventor: Isaac Avitan, c/o Schaeff Inc., P.O. Box 9700, Sioux City, Iowa 51102-9700

[21] Appl. No.: 207,299

[22] Filed: Mar. 7, 1994

[51] Int. Cl.$^6$ .................................................. B62D 11/02
[52] U.S. Cl. .................. 180/6.5; 180/6.28; 318/587; 318/67; 318/77
[58] Field of Search ........................... 180/6.5, 6.48, 180/6.2, 6.28, 6.24; 318/587, 139, 67, 68, 82, 85, 77, 52

[56] References Cited

U.S. PATENT DOCUMENTS

| | | | |
|---|---|---|---|
| Re. 34,057 | 9/1992 | Middlesworth | 180/6.5 X |
| 644,853 | 3/1900 | Fahl | 180/6.5 |
| 3,481,417 | 12/1969 | Jarret | 180/6.5 |
| 3,720,863 | 3/1973 | Ringland | 318/52 |
| 3,870,935 | 3/1975 | Abels | 180/6.5 |
| 4,128,137 | 12/1978 | Booth | 180/6.5 |
| 4,449,598 | 5/1984 | Hönes et al. | 180/6.5 |
| 4,511,825 | 4/1985 | Klimo | 180/6.5 X |
| 4,520,299 | 5/1985 | Konrad | 180/6.5 X |
| 4,634,941 | 1/1987 | Klimo | 180/6.5 X |
| 4,697,661 | 10/1987 | Pajerski et al. | 180/6.5 |
| 4,926,952 | 5/1990 | Farnam | 180/6.5 |
| 5,022,476 | 6/1991 | Weege | 180/6.5 |
| 5,044,043 | 9/1991 | Basham et al. | 180/6.5 X |
| 5,058,016 | 10/1991 | Davidovitch | 180/6.5 X |

Primary Examiner—Margaret A. Focarino
Assistant Examiner—F. Zeender
Attorney, Agent, or Firm—Natter & Natter

[57] ABSTRACT

A turning control system for an electric vehicle includes a differential filter which receives a signal indicative of a desired vehicle steer angle and generates a pair of signals representative of proportional speed and direction at a left and a right drive wheel of the vehicle. Speed limit factors generated by an angular speed limit filter and an operator set throttle control are applied to the signals indicative of proportional speeds to generate desired proportional speed signals. The desired proportional speed signals are applied to a motor coupling controller along with signals indicating the actual motor speeds. Error signals representative of the difference between the desired speed and the actual speed of each motor are scaled and integrated to generate lag signals (representative of accumulated error) and the lag signal of one motor is applied to the desired proportional speed signal of the other motor to generate coupled control signals which are applied to respective left and right motor control circuits.

21 Claims, 3 Drawing Sheets

COUPLED DIFFERENTIAL TURNING CONTROL SYSTEM FOR ELECTRIC VEHICLE TRACTION MOTORS

BACKGROUND OF THE INVENTION

1. Field of the Invention

This invention relates generally to electric vehicles and more particularly to a differential turning control system for a vehicle having a pair of drive wheels and a steer wheel which pivots about a substantially vertical axis.

2. Related History

Electric motors have been employed as a traction motive source for various land vehicles including automobiles, trucks, delivery vans, wheel chairs, material handling trucks and industrial fork lifts.

A stored energy supply, carried by the vehicle, generally comprised batteries which accounted for a significant proportion of the total vehicle weight and, in the case of fork lift vehicles, provided a valuable counterbalance for the payload. Many fork lift vehicles included a pair of drive wheels positioned along a fixed common axis adjacent opposite sides of the vehicle. Each of the drive wheels was driven by a separate dc traction motor through a gearing.

During turning of the vehicle as opposed to straight movement, the inner drive wheel i.e. the wheel closest to the center of the curvature, traversed the support surface, e.g. cement warehouse floor, steel loading ramp, dock plate, etc., at a slower rate of speed than the outer drive wheel. In order to avoid slipping, erratic vehicle movement, loss of vehicle control, and undue drive wheel wear, it was therefore necessary to change the speed of the drive wheels relative to one another during turning.

In U.S. Pat. No. 3,870,935, issued to Ables et al., a system for permitting differential operation of industrial fork lift truck drive wheels was disclosed. The approach taken was to deenergize the traction motor connected to the inner drive wheel. Such deenergization was effected utilizing switches connected to a pulse generating circuit for selectively cutting off one or the other motor. This approach suffered from the disadvantage of rendering the vehicle difficult to maneuver and failed to provide a smooth transition in drive wheel speed variations as well as the requisite wheel speeds necessary for precise rolling contact between the drive wheels and the supporting surface during turns. Further, when one of the motors was turned off to effect a turning maneuver, the entire torque load was transferred to the other motor. Hence, each motor was required to have the size and capacity to individually propel the vehicle and load work. This resulted in high component costs associated with larger, more powerful traction motors than required when torque loads were shared between traction motors.

Maneuverability was an especially significant feature in connection with industrial fork lift vehicles which were often operated with limited visibility, in tight spaces, carrying heavy loads and with the load center elevated above the center of gravity of the vehicle.

Safety factors also required consideration of the maximum speed within which a turn having a specific radius of curvature could be safely effected, especially in view of variable parameters such as load weight range and load center elevation. Generally, as the radius of curvature of a turn decreased, maximum vehicle speed was required to be decreased.

In U.S. Pat. No. 4,520,299, issued to Konrad, a variable differential control system for a pair of drive wheel traction motors was shown. The system also implemented the constraint that maximum vehicle speed was to be limited as a function of a steer wheel angle. The control system employed a minimum field selector which assured a minimum traction motor field excitation; vehicle speed was not decreased until some minimum preselected turning angle was reached.

While the system disclosed in U.S. Pat. No. 4,520,299 presented a considerable improvement over the prior approach of merely turning off the traction motor for the inner drive wheel, disadvantages remained.

Prior control systems were also deficient because actual rotation speeds of the traction motors were not taken into consideration when demand signals were generated for differentially controlling the traction motor speeds to effect a desired steering maneuver. Instances occurred wherein, because of lag inherent in motor operation, one of the traction motors did not attain the speed necessary to effect the desired turn. Because the prior steering control systems separately excited each of the motors without monitoring the status of the motors, lag or error in actual motor speeds were not compensated, which may have resulted in uncontrolled operation.

SUMMARY OF THE INVENTION

A differential steering control is provided for an electric vehicle having a pair of traction motor powered left and right drive wheels which rotate on a common fixed axis and a steer wheel which pivots about a vertical axis. A signal indicative of the steer wheel position relative to a reference plane, i.e. the steer angle, and a reference signal indicative of an operator requested desired vehicle speed and direction are generated. The steer angle signal is fed to both an angular speed limit filter and a differential filter.

At the angular speed limit filter, an angular limit factor signal is generated for limiting vehicle speed relative to the steer angle, while at the differential filter, a pair of signals are generated, one representative of vehicle speed and direction at the left drive wheel and the other, representative of vehicle speed and direction at the right drive wheel for effecting a turn at the desired steer angle.

The reference signal indicative of the desired vehicle speed and direction is applied to a speed limiting saturation filter along with the angular limit factor signal. The output of the speed limiting saturation filter is a signal representative of the vehicle speed limit relative to the steer angle and the operator requested speed for the selected turning maneuver. The speed limit signal is multiplied by the respective left and right differential filter output signals to generate left and right signals indicative of the desired proportional speeds of the respective motors.

The left and right desired proportional speed signals are applied to summers in a motor speed coupling controller together with feedback signals representative of the actual vehicle speeds at the left and right drive wheels to generate left and right wheel instantaneous error signals. Each instantaneous error signal is divided by a gain factor constant to generate a scaled error signal which is applied to an integrator to generate left and right speed lag signals.

The difference between the left lag signal and the right desired proportional speed signal comprises a right motor coupled control signal which is generated at a summer and applied to a right motor drive circuit. Similarly the difference between the right lag signal and the left desired proportional speed signal comprises a left motor coupled control signal which is generated at a summer and applied to a left motor drive circuit.

In order to prevent inconsistent lag signals from effecting the motor drive circuits, a logic conflict resolver prioritizes the application of the left and right lag signals to their respective summers.

From the foregoing compendium, it will be appreciated that it is an aspect of the present invention to provide a differential turning control system for an electric vehicle of the general character described which is not subject to the disadvantages of the aforementioned related history.

It is a feature of the present invention to provide a differential turning control system for electric vehicles of the general character described wherein control signals applied to left traction motor and a right traction motor controls are coupled to assure that lag or error in the following speed of one motor is accounted for when controlling the speed of the other motor.

A consideration of the present invention is to provide a differential turning control system for electric vehicles of the general character described which assures safe vehicle operation of industrial fork lift vehicles through all available steer angles.

Another feature of the present invention is to provide a differential turning control system for electric vehicles of the general character described which assures the application of control signals for the required proportional relationship between speeds of a left and a right drive wheel during a turning maneuver.

An aspect of the present invention is to provide a differential turning control system for electric vehicles of the general character described which is relatively low in cost and suitable for economical mass production fabrication.

To provide a differential turning control system for electric vehicles of the general character described wherein torque loads during turning maneuvers are always distributed among a pair of traction motors is another feature of the present invention.

A further consideration of the present invention is to provide a differential turning control system for electric vehicles of the general character described wherein separate proportional values for controlling the operation of each of a pair of traction motors are coupled with feedback signals indicative of the speed of the motors for accommodating lag or error in the following speeds of the motors.

A still further aspect of the present invention is to provide a differential turning control system for electric vehicles of the general character described wherein a signal indicative of the desired steer angle is employed to generate a pair of signals representative of the proportional speed of a left and a right wheel traction drive motor.

To provide a differential turning control system of the general character wherein operational safety during turning maneuvers is assured by coupling the outputs of a pair of traction motors with differential steering control signals of the opposite traction motor of the pair is another consideration of the present invention.

Other aspects, features and considerations in part will be obvious and in part will be pointed out hereinafter.

With these ends in view, the invention finds embodiment in certain combinations of elements, arrangements, parts and series of steps by which the said aspects, features and considerations and certain other aspects, features and considerations are hereinafter attained, all as more fully described with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 3:
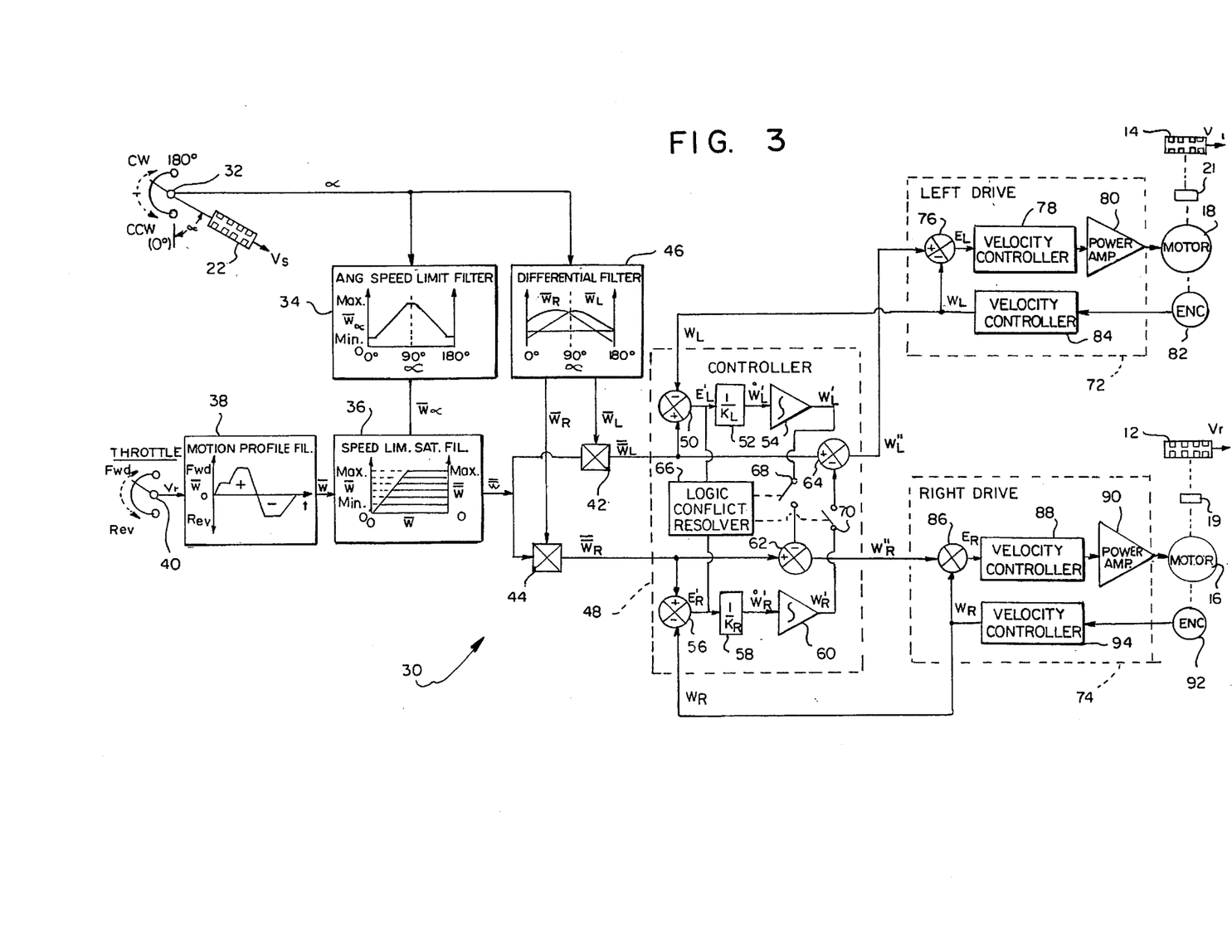
FIG. 3 is a schematized block diagram of a coupled differential turning control system constructed in accordance with and embodying the invention and illustrating a motor speed coupling controller which receives left and right drive motor desired proportional speed signals and feedback signals representative of the actual speeds of the left and right motors and which generates a left and right coupled control signals for effecting the desired turning maneuver while compensating for lag in the opposite motor.

Referring now in detail to the drawings, the reference numeral 10 denotes generally an electric vehicle driven by a propulsion system which includes a right drive wheel 12 and a left drive wheel 14. The right and left drive wheels 12, 14 are drivingly coupled to a corresponding dedicated dc traction motor 16, 18 respectively through a gear reducer 19, 21 respectively (FIG. 3).

Figure 1:
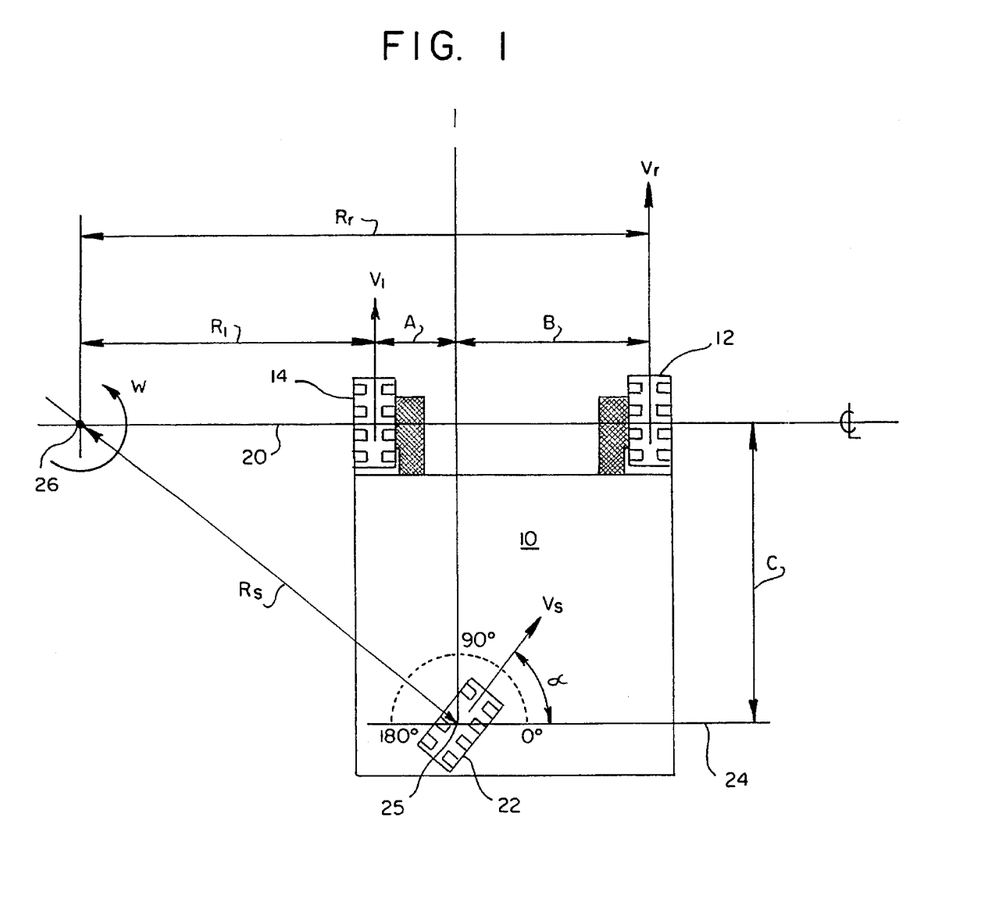
FIG. 1 is a schematized plan view of an electric vehicle having a pair of drive wheels positioned along a fixed axis and a third, pivotable steer wheel positioned at a steer angle $\alpha$ relative to the fixed axis of the drive wheels.

The right and left drive wheels 12, 14 are mounted to the vehicle adjacent the respective right and left sides thereof about a fixed axis 20. Vehicle steering is effected through a steer wheel 22 having a substantially vertical steer pivot axis 25. As depicted in FIG. 1, the steer pivot axis 25 is offset laterally from the center of the left drive wheel 14 a distance "A" and from the right drive wheel 12 a distance "B". Further, the steer pivot axis 25 is spaced rearwardly from the drive wheel axis 20 a distance "C". A vertical reference plane 24 parallel to the drive wheel axis 20 passes through the steer pivot axis.

If the vehicle 10 is controlled to proceed in a straight path, the steer wheel 22 is oriented with respect to the reference plane 24, at a steer angle $\alpha$ of 90°. If a turn is to be effected, however, the steer wheel is pivoted to a steer angle somewhere between 0° and 180°, excluding, however, 90°.

From an examination of FIG. 1, it will be appreciated that for any given steer angle $\alpha$, the velocity of the left drive wheel 14 represented by the vector $V_l$ and the velocity of the right drive wheel 16 represented by the vector $V_r$ can be determined from the following trigonometric relationship where the velocity vector $V_s$ represents velocity of the steer wheel 22:

$$V_l = V_s(\sin\alpha - (A/C)\cos\alpha)$$

$$V_r = V_s(\sin\alpha + (B/C)\cos\alpha)$$

Further, angular velocity W of the vehicle can be determined by the relationship:

$$W = 17.6\, V_s/R_s$$

where $R_s$ is the steer wheel radius of curvature and may be determined as follows:

$$R_s = |C| \cos \alpha|$$

In a typical electric industrial fork lift vehicle such as a Schaeff Model E3, available from Schaeff Incorporated of Sioux City, Iowa, the fixed dimensional parameters, with reference to FIG. 1, are as follows:

A=9.25 inches
B=25.75 inches
C=46.75 inches
Drive Wheel Radius=8 inches.

Figure 2:
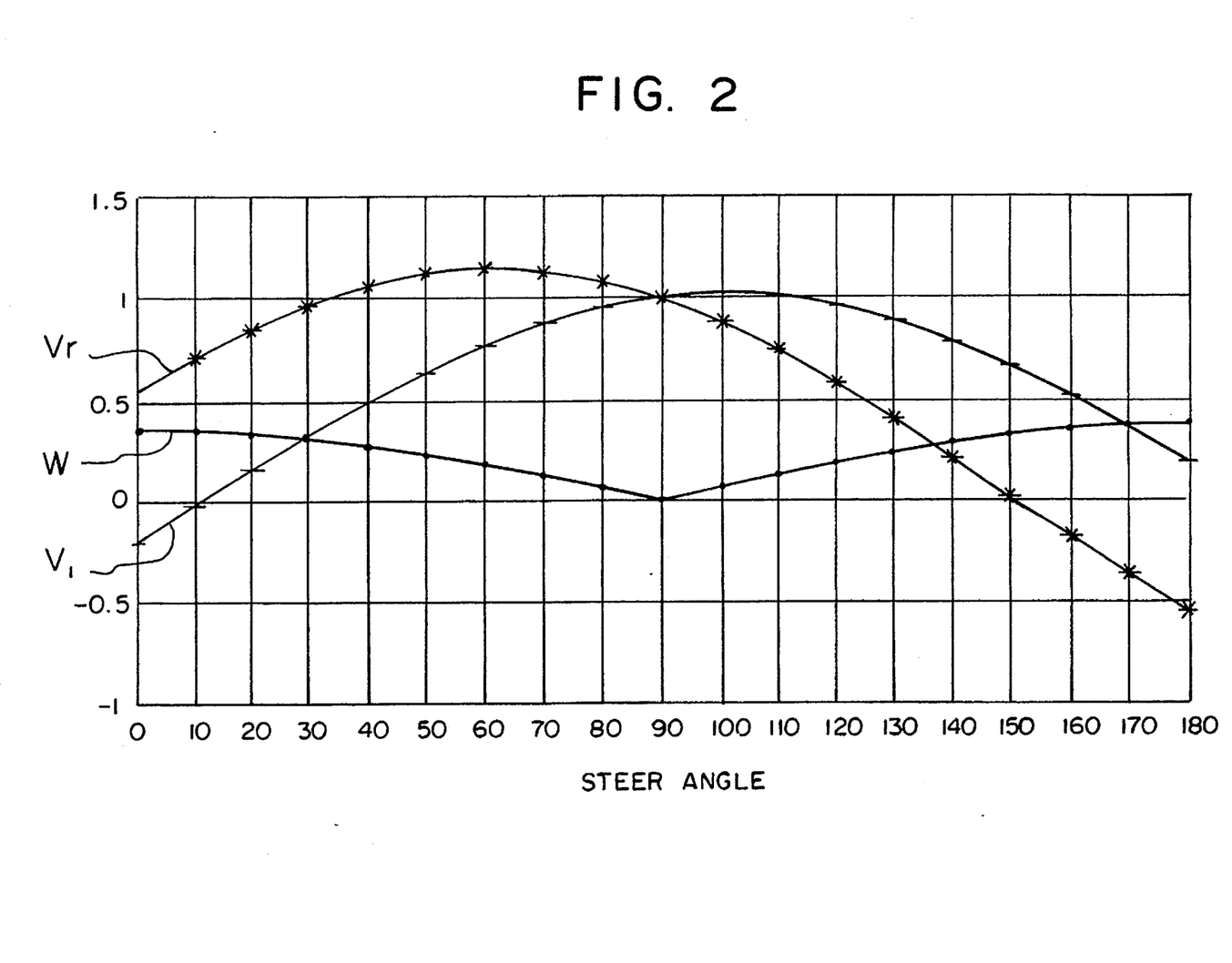
FIG. 2 is a graphic plotting of the left and right drive wheel unit speeds and the rotation speed of the vehicle as a function of steer angle.

By assigning a steer wheel speed reference value $V_s$ of unity, i.e., 1.0 mile per hour, for the steer wheel 22, the speeds $V_l$ and $V_r$ may be determined for any steer wheel angle $\alpha$. In FIG. 2, which depicts plotted values of $V_l$ and $V_r$ for the Schaeff Model E3, the x axis represents steer angle $\alpha$ and the y axis represents speed of $V_l$ and $V_r$ in miles per hour.

Additionally plotted in FIG. 2 is the angular velocity W of the vehicle in radians per second (y axis) as a function of the steer angle $\alpha$.

It should be noted, from an examination of FIG. 2, that for the above noted vehicle configuration, with steer angles $\alpha$ of between 0° and approximately 11°, the left drive wheel rotates in a reverse direction and for steer angles of between approximately 151° and 180°, the right drive wheel rotates in a reverse direction, hence the respective left and right traction motors 18, 16, must reverse their direction of rotation.

Referring now to FIG. 3, wherein a schematized representation of an electric vehicle traction motor drive system is illustrated, the reference numeral 30 denotes generally a coupled differential turning control system constructed in accordance with and embodying the invention. The system 30 receives a steer angle reference input signal generated by a transducer 32 positioned either adjacent the steer wheel 22 (to sense the actual steer wheel angle $\alpha$) or positioned adjacent or part of an operator steer wheel control (to sense the desired steer angle).

The steer angle signal is received at an angular speed limit filter 34 which functions to provide an angular limit factor for progressively limiting vehicle speed as the vehicle steer wheel radius of curvature $R_s$ decreases.

For example, with a steer angle $\alpha$ at 90° or, for example, within 15° greater or less than 90°, the vehicle 10 is travelling in a substantially straight or slightly curved path and load centrifugal force will not present a significant consideration, hence maximum vehicle speed, e.g., 7 miles per hour, should be permitted. As the steer angle $\alpha$ approaches within a 15° range of 0° or 180°, the maximum vehicle speed should be at a minimum value of, for example, 1 mile per hour. Between the 90°±15° range and the 15° range of 0° or 180° of steer angles $\alpha$, the maximum permissible vehicle speed gradually varies and may vary as a linear function as depicted in the drawing figure block representing the angular speed limit filter 34.

The angular speed limit filter output $\overline{W}_\alpha$ comprising an angular limit factor signal, is applied to a speed limiting saturation filter 36. The filter 36 also receives a signal $\overline{W}$ representative of reference value vehicle speed and direction. Such signal is generated by a motion profile filter 38 which receives an operator throttle reference signal $V_r$, generated by a throttle decoder 40.

The speed limiting saturation filter 36 determines if the operator requested vehicle speed signal $\overline{W}$ exceeds the angular limit factor signal and generates an output signal which is the lesser of either the angular limit factor signal $\overline{W}_\alpha$ or the desired vehicle speed signal $\overline{W}$. The speed limiting saturation filter output signal $\overline{W}$ is simultaneously applied to a left multiplier 42 and a right multiplier 44.

To provide differential steering control, the steer angle signal is also received at a differential filter 46 for generating the differential left and right vehicle speed signals $V_l$ and $V_r$ as a function of steer angle. Such functions have been graphically depicted in FIG. 2 and the differential filter 46 may either comprise a lookup table or a subroutine for generating the appropriate values of $V_l$ and $V_r$ for the steer angle value applied at its input.

The differential filter outputs comprise a pair of signals $\overline{W}_R$ and $\overline{W}_L$, representing vehicle speed and direction at the respective right and left drive wheels necessary to effect rolling contact of the associated right and left drive wheels with a support surface at the specified steer angle.

The signal $\overline{W}_L$ is applied to the multiplier 42 along with the speed limiting saturation filter output signal $\overline{W}$ to generate a signal $\overline{\overline{W}}_L$ indicative of desired proportional speed of the vehicle at the left drive wheel 14. Similarly, the differential filter output signal $\overline{W}_R$ is applied to the multiplier 44 along with the signal $\overline{W}$ to generate a signal $\overline{\overline{W}}_R$ indicative of the desired proportional speed of the vehicle at the right drive wheel 12.

Pursuant to the invention, the signals $\overline{\overline{W}}_L$ and $\overline{\overline{W}}_R$ are applied to a left-right motor speed coupling controller 48. The motor coupling controller 48 includes a summer 50 which receives the signal $\overline{\overline{W}}_L$, indicative of desired proportional speed of the vehicle at the left drive wheel, and subtracts therefrom a signal indicative of the actual vehicle speed at the left drive wheel $W_L$ to generate a left motor instantaneous error signal $E'_L$. The left instantaneous error signal is, in turn, divided by a left instantaneous gain factor $K_L$ at a multiplier 52 to generate a scaled left derivative error signal $\mathring{W}_L$. An integrator 54 receives the scaled left derivative error signal $\mathring{W}'_L$ and generates a left motor lag signal $W'_L$, representative of accumulated left motor error as follows:

$$W_L' = \frac{1}{K_L} \int_0^t d(\overline{\overline{W}}_L - W_L).$$

Similarly, the signal $\overline{\overline{W}}_R$ is applied to a summer 56 along with a signal representative of the actual vehicle speed at the right drive wheel $W_R$ with the difference comprising a right motor instantaneous error signal $E'_R$. A multiplier 58 divides the instantaneous error signal $E'_R$ by a gain factor constant $K_R$ to generate a scaled right derivative error signal $\mathring{W}'_R$. The scaled right derivative error signal $W_R$ is applied to an integrator 60 which generates a right motor lag signal $W'_R$ as follows:

$$W_R' = \frac{1}{K_R} \int_0^t d(W_R - W_R).$$

It should be understood that the gain factor values $K_L$ and $K_R$ are constants which may be determined empirically utilizing computer simulation.

The control system 30 thereafter employs the left motor lag signal in controlling the right motor speed and the right motor lag signal in controlling the left motor speed so that control of each motor inherently compensates for the actual status of the opposite motor in effecting a desired vehicle turn.

In accordance with the invention, the left motor lag signal $W'_L$ is subtracted from the right proportional speed signal $\overline{W}_R$ at a summer 62 to generate a right motor coupled control signal $W''_R$. Similarly, a summer 64 generates a left motor coupled control signal $W''_L$ as the difference between the left desired proportional speed signal $\overline{W}_L$ and the right motor lag signal $W'_R$.

In order to avoid inconsistent control signals $W''_L$ and $W''_R$ where conflicting lag signals are generated by the respective left and right integrators 54, 60, a conflict resolver 66 is provided in the left-right motor coupling controller 48. The conflict resolver 66 monitors the status of the left and right instantaneous error signals $E'_L$ and $E'_R$ and the lag signals $W'_L$ and $W'_R$ and controls appropriate switches 68, 70 interconnecting the left lag signal $W'_L$ with the right summer 62 and the right lag signal $W'_R$ with the left summer 64, respectively. The conflict resolver may comprise a suitable logic circuit which selectively opens and closes the switches, 68, 70 to eliminate harmonics and the like.

A typical conflict would occur, for example, if one wheel engages an obstacle resulting in increased motor torque load. As the instantaneous error builds, the lag signal, representative of accumulated error, increases significantly with time, reducing the speed of the opposite motor. Once the obstacle is cleared, the one wheel is free to rotate without error, resulting in an almost instantaneous motor speed increase, since the lag signal of the other motor is close to or at zero. The speed of other motor remains reduced, however, since the accumulated error, i.e., lag, of the one motor is not instantaneously reduced. To prevent such occurrence, the conflict resolver monitors the instantaneous error signals $E'_L$ and $E'_R$ to detect sharply reduced error and, if detected, bypasses the respective integrator by opening the switch 68 or the switch 70 connecting the associated lag signal with the summer which generates the coupled control signal of the opposite motor.

As will be noted from FIG. 3, the left motor coupled control signal $W''_L$ and the right motor coupled control signal $W''_R$ are applied to a left motor drive circuit 72 and a right motor dive circuit 74 respectively. The left motor drive control circuit 72 is depicted in schematized fashion as employing a summer, 76 which receives the left motor coupled control signal as a reference speed input signal and which also receives the signal $W_L$ representative of actual vehicle speed at the left drive wheel and generates a difference signal comprising a left motor error signal $E_L$. The signal $E_L$ is applied to a velocity controller 78 and from the velocity controller to a power amplifier 80 for control of the motor 18.

To generate the vehicle speed signal $W_L$ at the left drive wheel, an encoder 82, coupled to the armature of the motor 18, generates a motor speed signal which is applied to a velocity converter 84 which, in turn, generates the vehicle speed signal $W_L$.

With respect to the right motor drive circuit 74, such circuit receives the right motor coupled control signal as a desired speed input signal at a summer 86 which also receives the vehicle speed signal $W_R$. A difference error signal $E_R$ is generated by the summer 86 and applied to a velocity controller 88 which generates a signal applied to a power amplifier 90.

In a manner identical to that employed with respect to the motor 18, an encoder 92 is employed for generating a signal which is a function of the speed of the right motor 16 and the encoder signal is applied to a velocity converter 94 which generates the signal $W_R$, indicative of vehicle speed at the right drive wheel.

It should be appreciated that the left motor control circuit and the right motor control circuit 72, 74 are depicted in a generalized format. In actuality, any of a number of dc traction motor control circuits may be employed such as that disclosed in U.S. Pat. No. 4,188,569, incorporated herein by reference.

Further, the various filters, i.e. the motion profile filter, the speed limiting saturation filter, the angular speed limit filter and the differential filter, may comprise look up tables or algorithms from which the output values are generated.

It should also be understood that while separate components have been illustrated and described with respect to performing the functions of the angular speed limit filter, the differential filter, the motion profile filter, the speed limiting saturation filter, and the left-right motor speed coupling controller, a single microprocessor may be employed for implementing the various functions of the respective separately designated components.

Since steering control is effected by differential proportional control of the speeds of the left and right motors, it is possible to employ, in lieu of a controlled steer wheel, a caster which follows the drive wheels. In such instance, the steer angle reference signal is generated from an operator turn control which does not move a steer wheel to the desired steer angle.

It should also be appreciated that the control system has been described as generating various signal values representative of vehicle speeds, rather than motor speeds or wheel speeds, as a matter of convenience only and that since a direct proportion exists between all such speed values, the mode of operation remains the same regardless of which values are employed. For example, a signal representative of vehicle speed at the left drive wheel is also representative of wheel speed at the left drive wheel and the speed of the left traction motor.

Thus it will be seen that there is provided a coupled differential turning control signal for electric vehicle traction motors which achieves the various aspects, features and considerations of the present invention and which is well suited to meet the conditions of practical usage.

Since various possible embodiments might be made of the present invention without departing from the spirit thereof, and since various changes might be made in the exemplary embodiment shown herein, it is to be understood that all matter herein described or shown in the accompanying drawings is to be interpreted as illustrative and not in a limiting sense.

Having thus described the invention as claimed as new and desired to be secured by Letters Patent:

1. A turning control system for an electric vehicle which traverses a support surface along a direction of travel, the vehicle having a left traction motor and a right traction motor, a left motor drive control circuit for controlling the operation of the left traction motor and a right motor drive control circuit for controlling the operation of the right traction motor, means drivingly coupling each traction motor with traction means for engaging and propelling the vehicle over a support surface, the traction means being laterally spaced from one another relative to the direction of travel of the vehicle, the turning control system comprising means for generating a signal representative of a desired vehicle steer angle, means receiving the desired vehicle steer angle signal and in response thereto, generating a left reference signal and a right reference signal, each reference signal being representative of the required speed and direction of the respective left and right traction motor for effecting a vehicle turn at the desired steer angle, the turning control system further including motor coupling means, the motor coupling means including means for receiving a signal representative of the instantaneous speed of the left traction motor, for receiving a signal representative of the instantaneous speed of the right traction motor and for receiving the reference signals and in response thereto, generating a signal representative of speed lag of the left traction motor and generating a signal representative of speed lag of the right traction motor, means for modifying the left reference signal as a function of the signal representative of the speed lag of the right traction motor to generate a left motor coupled control signal and means for modifying the right reference signal as a function of the signal representative of the speed lag of the left traction motor to generate a right motor coupled control signal, the turning control system further including means for applying the left motor coupled control signal to the left motor drive control circuit and means for applying the right motor coupled control signal to the right motor drive control circuit, whereby effective speed control is provided for each traction motor which compensates for speed lag in the respective opposite motor to avoid oversteering and understeering and to provide slip free engagement between the traction means and the support surface.

2. A turning control system for an electric vehicle as constructed in accordance with claim 1 wherein the means for modifying the left reference signal includes first summing means, the first summing means receiving the left reference signal and the signal representative of the speed lag of the right traction motor and in response thereto, modifying the left reference signal and generating a difference signal comprising the left motor coupled control signal, the means for modifying the right reference signal including second summing means, the second summing means receiving the right reference signal and the signal representative of the speed lag of the left traction motor and in response thereto, modifying the right reference signal and generating a difference signal comprising the right motor coupled control signal.

3. A turning control system for an electric vehicle as constructed in accordance with claim 1 wherein the motor coupling means further comprises a left integrator means and a right integrator means, a left summing means and a right summing means, the left summing means receiving the left reference signal and the signal representative of the instantaneous speed of the left traction motor and in response thereto, generating a left motor error signal, means for scaling the left motor error signal, the left motor error signal scaling means receiving the left motor error signal and generating a scaled left motor error signal, the left integrator means receiving the scaled left motor error signal and in response thereto generating the left motor speed lag signal, the right summing means receiving the right reference signal and the signal representative of the instantaneous speed of the right traction motor and in response thereto, generating a right motor error signal, means for scaling the right motor error signal, the right motor error signal scaling means receiving the right motor error signal and generating a scaled right motor error signal, the right integrator means receiving the scaled right motor error signal and in response thereto, generating the right motor speed lag signal.

4. A turning control system for an electric vehicle as constructed in accordance with claim 2, the motor coupling means further including conflict resolving means for preventing inconsistent lag signals from being simultaneously applied to the first and second summing means, the conflict resolving means including means selectively interconnecting the right motor speed lag signal and the first summing means and means selectively interconnecting the left motor speed lag signal and the second summing means.

5. A turning control system for an electric vehicle as constructed in accordance with claim 4 wherein the conflict resolving means includes means for selecting between the left motor speed lag signal and the right motor speed lag signal in the event a conflict is detected and for permitting only the selected lag signal to be applied to the respective summer.

6. A turning control system for an electric vehicle as constructed in accordance with claim 1 further including means for limiting the maximum value of the left reference signal and the maximum value of the right reference signal as a function of the desired vehicle steer angle whereby vehicle speeds will be maintained within a safety range during turns.

7. A turning control system for an electric vehicle as constructed in accordance with claim 6 wherein the means for limiting the maximum value of the left reference signal and the maximum value of the right reference signal as a function of the vehicle steer angle comprises means for receiving the signal representative of the desired vehicle steer angle and in response thereto, generating a limit signal, the means for generating the left reference signal and the right reference signal including means for receiving the limit signal and in response thereto, generating the left reference signal and the right reference signal as a function of both the desired vehicle steer angle signal and the limit signal.

8. A turning control system for an electric vehicle as constructed in accordance with claim 7 wherein the means for receiving the signal representative of the desired vehicle steer angle and for generating a limit signal includes means for receiving a signal indicative of desired vehicle speed and direction, the means for generating the limit signal receiving the signal indicative of desired vehicle speed and direction and the signal representative of the desired vehicle steer angle and in response thereto, generating the limit signal as a function of both the desired vehicle steer angle and the desired vehicle speed and direction whereby vehicle speed during turning maneuvers will not exceed the desired vehicle speed.

9. In an electric vehicle having a left drive wheel and a right drive wheel, the drive wheels being in contact with a support surface and being driven by a left traction motor and a right traction motor respectively, a left motor drive control circuit for controlling the operation of the left traction motor and a right motor drive control circuit for controlling the operation of the right traction motor, the drive wheels being laterally spaced about a fixed transverse axis, the vehicle having a pivotable steer wheel having a pivot axis positioned longitudinally from the fixed transverse axis a distance C and with the transverse distance between the pivot axis of the steer wheel and the left drive wheel being designated A and the transverse distance between the pivot axis of the steer wheel and the right drive wheel being designated B and with the steer wheel being oriented at a steer angle $\alpha$ relative to the fixed transverse axis, the improvement comprising a differential control system for providing proportional control of the left motor drive control circuit and the right motor drive control circuit to effect a vehicle turning maneuver, the control system including means for generating a desired speed reference signal, means for receiving a signal representative of the steer angle $\alpha$, and in response thereto generating a signal $V_l$ representative of the proportional required speed and direction of the left traction motor and generating a signal $V_r$ representative of the proportional required speed and direction of the right traction motor for effecting a vehicle turn at the steer angle α according to the following relationship:

$$V_l=(\sin \alpha-(A/C) \cos \alpha)$$

$$V_r=(\sin \alpha+(B/C) \cos \alpha)$$

the differential control system further including means for controlling maximum vehicle speed as a function of the steer angle α comprising means for receiving a signal representative of the steer angle α and in response thereto, generating an angular limit factor signal for progressively limiting vehicle speed as a function of decreasing vehicle radius of travel during a turning maneuver, means for receiving the desired speed reference signal and the angular limit factor signal and in response thereto, generating a limited desired speed signal, the differential control system further including means for generating a left motor reference signal which is a function of the signal $V_l$ and the limited desired speed signal, means for applying the left motor reference signal to the left motor drive control circuit and means for generating a right motor reference signal which is a function of the signal $V_r$ and the limited desired speed signal and means for applying the right motor reference signal to the right motor drive control circuit.

10. The improvement in an electric vehicle as constructed in accordance with claim 9 wherein the means for generating the signals $V_l$, $V_r$ comprises a look up table wherein values of the signals $V_l$ and $V_r$ for different steer angles are stored.

11. In an electric vehicle having a left drive wheel and a right drive wheel, the drive wheels being in contact with a support surface and being driven by a left traction motor and a right traction motor respectively, a left motor drive control circuit for controlling the operation of the left traction motor and a right motor drive control circuit for controlling the operation of the right traction motor, the drive wheels being laterally spaced about a fixed transverse axis, the vehicle having a pivotable steer wheel having a pivot axis positioned longitudinally from the fixed transverse axis a distance C and with the transverse distance between the pivot axis of the steer wheel and the left drive wheel being designated A and the distance between the longitudinal axis of the steer wheel and the right drive wheel being designated B and with the steer wheel being oriented at a steer angle α relative to the fixed axis, the improvement comprising a differential control system for providing proportional control of the left motor drive control circuit and the right motor drive control circuit to effect a vehicle turning maneuver, the control system including means for receiving a signal representative of the steer angle α, and in response thereto generating a signal $V_l$ representative of the proportional required speed and direction of the left traction motor and generating a signal $V_r$ representative of the proportional required speed and direction of the right traction motor for effecting a vehicle turn at the steer angle α according to the following relationship:

$$V_l=(\sin \alpha-(A/C) \cos \alpha)$$

$$V_r=(\sin \alpha+(B/C) \cos \alpha)$$

the differential control system further including means for generating a left motor reference signal which is a function of the signal $V_l$ and means for applying the left motor reference signal to the left motor drive control circuit and means for generating a right motor reference signal which is a function of the signal $V_r$ and means for applying the right motor reference signal to the right motor drive control circuit, the means for generating the signals $V_l$ and $V_r$ representative of the proportional required speed and direction of the left and right traction motors comprising motor coupling means, the motor coupling means including means for receiving signals representative of the instantaneous speed of the left traction motor and the instantaneous speed of the right traction motor and for determining the speed lag of the left traction motor and the speed lag of the right traction motor and for generating the left motor reference signal as a function of signal $V_l$ and the speed lag of the right traction motor and for generating the right traction motor reference signal as a function of the signal $V_r$ and the speed lag of the left traction motor.

12. The improvement in an electric vehicle as constructed in accordance with claim 11 wherein the means for generating the left motor reference signal and the right motor reference signal includes conflict resolving means for monitoring the left motor speed lag and for monitoring the right motor speed lag and for preventing inconsistent speed lags from simultaneously affecting the generation of both the left motor reference signal and the right motor reference signal.

13. The improvement in an electric vehicle as constructed in accordance with claim 12 wherein the conflict resolving means includes means for selecting between the left motor lag and the right motor lag in the event a conflict is detected and for permitting only a selected lag signal to be employed in generating the associated motor reference signal.

14. A turning control system for an electric vehicle as constructed in accordance with claim 3, the motor coupling means further including conflict resolving means for preventing inconsistent speed lag signals from being simultaneously employed by the means for modifying the left reference signal and the means for modifying the right reference signal, the conflict resolving means including means selectively interconnecting the signal representative of the speed lag of the right traction motor and the means for modifying the left reference signal and means selectively interconnecting the signal representative of the speed lag of the left traction motor and the means for modifying the right reference signal and means interconnecting the conflict resolving means with the left motor error signal and the right motor error signal, the conflict resolving means including means for monitoring the status of said error signals.

15. A method of controlling an electric vehicle which traverses a support surface along a direction of travel during a turning maneuver, the vehicle having a left traction motor and a right traction motor, a left motor drive control circuit for controlling the operation of the left traction motor and a right motor drive control circuit for controlling the operation of the right traction motor and means drivingly coupling each traction motor with traction means for engaging and propelling the vehicle over a support surface, the method comprising the steps of:

(a) generating a signal representative of a desired steer angle for the turning maneuver;

(b) employing the signal representative of the desired steer angle to generate a left traction motor reference signal and a right traction motor reference signal, the reference signals being proportional to the required speeds of the left and right traction motors for effecting the turning maneuver at the desired steer angle;

(c) generating a signal representative of the actual motor speed of the left traction motor and generating a signal representative of the actual speed of the right traction motor;

(d) generating a left motor speed lag signal as a function of the left motor reference signal and the actual speed of the left motor and generating a right motor speed lag signal as a function of the right motor reference speed signal and the actual speed of the right motor;

(e) employing the left motor reference speed signal and the right motor speed lag signal to generate a left motor coupled control signal and employing the right motor reference speed signal and the left motor speed lag signal to generate a right motor coupled control signal; and (f) applying the left motor coupled control signal to the left motor drive control circuit and the right motor coupled control signal to the right motor drive control circuit.

16. A method of turning an electric vehicle in accordance with claim 15 wherein the difference between the left motor reference speed signal and the left motor actual speed signal is scaled and integrated to generate the left motor lag signal and the difference between the right motor reference speed signal and the actual speed of the right motor is scaled and integrated to generate the right motor speed lag signal.

17. The improvement in an electric vehicle as constructed in accordance with claim 9 wherein the means for generating a desired speed reference signal comprises a throttle decoder, the throttle decoder being operatively connected to an operator throttle control, the throttle decoder generating an output signal.

18. The improvement in an electric vehicle as constructed in accordance with claim 17, the means for generating a desired speed reference signal further comprising means for receiving the throttle decoder output signal and in response thereto, generating a signal representative of desired vehicle speed and direction, the signal representative of desired speed and direction comprising the desired speed reference signal.

19. The improvement in an electric vehicle as constructed in accordance with claim 9 wherein the means for receiving a signal representative of the steer angle $\alpha$ and generating an angular limit factor signal comprises means for varying the angular limit factor signal to a maximum signal value when the steer angle $\alpha$ is within a predetermined range of 75°–105° and for varying the angular limit factor signal to a minimum value when the steer angle $\alpha$ is within a predetermined range of 0°–15° and within a predetermined range of 165°–180°.

20. The improvement in an electric vehicle as constructed in accordance with claim 9 wherein the means for generating the angular limit factor signal comprises means for varying the angular limit factor signal as a linear function of the steer angle $\alpha$ between predetermined minimum and maximum values.

21. The improvement in an electric vehicle as constructed in accordance with claim 9 wherein the means for receiving the filtered speed limit signal and the angular limit factor signal includes means for comparing the desired speed reference signal and the angular limit factor signal and for generating a limited desired speed signal which comprises the angular limit factor signal when the limited speed reference signal exceeds the value of the angular limit factor signal and for generating a limited desired speed signal comprising the desired speed reference signal when the value of the angular limit factor signal exceeds the value of the desired speed reference signal.

* * * * *